(12) United States Patent
Chapron

(10) Patent No.: US 10,029,905 B2
(45) Date of Patent: Jul. 24, 2018

(54) DEVICE FOR TRANSFERRING A LIQUID FROM A CAN TO A TANK IN A SEALED MANNER

(71) Applicant: EXEL INDUSTRIES, Paris (FR)

(72) Inventor: Fabien Chapron, Cercie (FR)

(73) Assignee: EXEL INDUSTRIES, Paris (FR)

( * ) Notice: Subject to any disclaimer, the term of this patent is extended or adjusted under 35 U.S.C. 154(b) by 26 days.

(21) Appl. No.: 14/867,206

(22) Filed: Sep. 28, 2015

(65) Prior Publication Data

US 2016/0090290 A1    Mar. 31, 2016

(30) Foreign Application Priority Data

Sep. 26, 2014  (FR) ..................................... 14 58642

(51) Int. Cl.

| | |
|---|---|
| *B67D 7/02* | (2010.01) |
| *B67D 7/32* | (2010.01) |
| *B08B 9/093* | (2006.01) |
| *A01M 7/00* | (2006.01) |
| *B08B 9/08* | (2006.01) |
| *B08B 9/20* | (2006.01) |

(52) U.S. Cl.
CPC .......... *B67D 7/0288* (2013.01); *A01M 7/0085* (2013.01); *B08B 9/0813* (2013.01); *B08B 9/093* (2013.01); *B08B 9/20* (2013.01); *B67D 7/0294* (2013.01); *B67D 7/3227* (2013.01)

(58) Field of Classification Search
CPC .......... B08B 9/0813; B08B 9/093; B08B 9/20; B67D 7/0288; B67D 7/0294; B67D 7/3227

USPC ........................................................... 141/65
See application file for complete search history.

(56) References Cited

U.S. PATENT DOCUMENTS

| | | | | |
|---|---|---|---|---|
| 5,465,875 A | * | 11/1995 | Garnett | ............... A01M 7/0092 |
| | | | | 134/166 R |
| 5,502,864 A | * | 4/1996 | Sorenson | ............ B05C 17/0205 |
| | | | | 15/144.4 |
| 2006/0081304 A1 | * | 4/2006 | Franks | ................. B67D 7/0205 |
| | | | | 141/65 |

FOREIGN PATENT DOCUMENTS

WO         9208548 A1     5/1992

* cited by examiner

*Primary Examiner* — Timothy L Maust
*Assistant Examiner* — Andrew Schmid
(74) *Attorney, Agent, or Firm* — Cantor Colburn LLP

(57) ABSTRACT

A device (10) for transferring a liquid from a can to a tank in a sealed manner, the device including a drawing end-piece which comprises a main sleeve designed to be connected on the neck of the can in a sealed manner, a drawing pipe which presents a first end connected on the drawing end-piece and a second end adapted to be connected on the tank in order to enable the drawing of the liquid from the can to the tank, and a rinsing pipe which presents a first end connected on the drawing end-piece and a second end adapted to be connected on a supply source of a rinsing fluid, in order to inject said rinsing fluid in the can, where the drawing end-piece includes a rinsing hose which is connected on the first end of the rinsing pipe and which is slidably mounted axially along the drawing axis in order to rinse the inner walls of the can.

12 Claims, 9 Drawing Sheets

DEVICE FOR TRANSFERRING A LIQUID FROM A CAN TO A TANK IN A SEALED MANNER

CROSS REFERENCE TO RELATED APPLICATION

This application is related to and claims the benefit of French Patent Application Number 14/58642 filed on 26 Sep. 2014, the contents of which are herein incorporated by reference in their entirety.

TECHNICAL FIELD

The invention concerns a device for transferring a liquid, such as a product that is hazardous to an operator, from a can to a tank, in a sealed manner.

In particular, the device allows filling a tank of an agricultural sprayer with a phytosanitary product contained in a can.

BACKGROUND

The filling of a tank is sometimes carried out manually by the operator, when the latter unscrews the cap of the can containing the phytosanitary product, he punctures the lid sealed on the neck of the can if necessary, manually discharges the content of the can in the tank and then cleans the empty can.

In order to rinse the can, the operator introduces water in the can, screws the cap again, shakes the can, and repeats these operations as many times as necessary.

Nonetheless, in most cases, the operator uses a rinsing nozzle which equips the sprayer, in order to rinse the can.

These operations pose risks of contact between the pollutant product contained in the can and the operator, in particular by accidental spill of the open can, or by splashing when discharging the can in the tank or when rinsing the can.

In addition, there is also a risk of inhalation of the product vapors.

In order to limit these risks, it is known to use a sealed filling device such as the device described in the document WO92/08548.

This kind of device includes a drawing end-piece which extends axially along a drawing axis from a first end to a second end equipped with a sleeve.

The sleeve is designed so as to be connected to a type of can necks.

Besides, the filling device includes a drawing pipe which presents a first end connected on the drawing end-piece and a second end adapted to be connected on the tank in order to enable the drawing of liquid from the can up to the tank, and a rinsing pipe which presents a first end connected on the drawing end-piece and a second end connected on a water supply source, for rinsing and cleaning the can.

In order to promote suction of the product contained in the can, the drawing end-piece is equipped with a vent valve which cooperates with an orifice.

Although this kind of filling devices allows limiting the risks of contact with the product contained in the can, it has several drawbacks.

Indeed, this kind of devices is compatible with only one type of can necks, that is to say a neck with a determined diameter.

In addition, nothing is provided to limit the risks of contact with the product contained in the can when puncturing the closure lid of the can.

Besides, it appears that the vent valve sometimes causes leakages of the product contained in the can or leakages of vapors of this product.

Furthermore, the rinsing of the can is generally carried out in a rough manner, since the water jet injected in the can by the rinsing pipe does not enable rinsing and cleaning the can effectively, the operator then has to shake the can in order to remove the product from the walls of the can.

Similarly, when uncoupling the drawing end-piece on the can, drops may trickle along the drawing end-piece.

BRIEF SUMMARY

In particular, the present invention aims to resolve these drawbacks, and for this purpose, it relates to a device for transferring a liquid from a can to a tank in a sealed manner, the device including:
- a drawing end-piece with a generally cylindrical shape which extends axially along a drawing axis from a first end to a second end equipped with at least one main sleeve, said sleeve being designed so as to be connected on the neck of the can in a sealed manner,
- a drawing pipe which presents a first end connected on the drawing end-piece and a second end adapted to be connected on the tank in order to enable drawing of a liquid from the can to the tank, and
- a rinsing pipe which presents a first end connected on the drawing end-piece and a second end adapted to be connected on a supply source of a rinsing fluid, in order to inject said rinsing fluid in the can, characterized in that the drawing end-piece includes a rinsing hose which is connected on the first end of the rinsing pipe and which is slidably mounted axially along the drawing axis, between a rest position wherein the rinsing hose is retracted in the drawing end-piece and a rinsing position wherein the rinsing hose is deployed in order to rinse the inner walls of the can.

Thus, the invention allows cleaning and rinsing effectively the inner walls of the can containing the product, in particular when the product is of the viscous type.

In addition, the rinsing hose is mounted in free rotation about the drawing axis in order to rinse the lateral inner walls of the can.

In order to recover the trickling drops coming from the drawing end-piece, the main sleeve presents a free end equipped with an annular anti-drip gutter which extends about the drawing axis.

Complementarily, the device includes a rinsing cap which is adapted to be mounted on the main sleeve in a sealed manner in order to enable the rinsing of the drawing end-piece.

According to a preferred embodiment, the device comprises a suction means which cooperates with the drawing pipe in order to enable the drawing of the liquid from the can to the tank.

The rinsing hose is also adapted to inject air directly inside the can, beyond the neck of the can.

This feature allows promoting the flow of the product through the neck, in addition or not to the suction of the product.

Furthermore, the drawing end-piece includes a check valve which forms a vent.

This check valve enables the suction of the air contained in the can and also enables compression of the can once the latter is empty.

According to another aspect, the drawing end-piece is equipped with a main perforator which presents a generally cylindrical shape along the drawing axis and which is adapted to puncture a lid sealing the neck of the can.

Thus, the invention allows drawing the liquid contained in the can without risks of contact with the liquid when puncturing the sealing lid of the can.

According to another feature, the main perforator presents a perforating free end, said perforator being slidably mounted axially along the drawing axis, between a retracted position and a puncturing position wherein said perforating free end enables the puncturing of the lid of said neck.

According to a preferred embodiment, the device includes at least one secondary sleeve which is designed to be mounted on the drawing end-piece and to be connected on the neck of a secondary can in a sealed manner.

Thus, the device may be adapted to different types of cans.

In addition, the secondary sleeve is associated with a secondary perforator which presents a generally cylindrical shape along the drawing axis and which is adapted to be mounted on the main perforator.

According to another feature, the device includes a drawing stick which extends axially along the drawing axis through a hole delimited by the drawing end-piece, from a first end connected on the drawing pipe, to a second drawing free end, the drawing stick being slidably mounted axially along the drawing axis with regard to the drawing end-piece, between a retracted position and a drawing position wherein the free end of the drawing stick is deployed to draw up the liquid contained in the can.

This feature allows drawing the liquid contained in the can without the need to turn the can upside down.

BRIEF DESCRIPTION OF THE DRAWINGS

Other features and advantages of the invention will appear upon reading the detailed description that follows for the understanding of which reference will be made to the appended drawings wherein.

DETAILED DESCRIPTION

In the description and the claims, the expressions «upper», «lower» and «low», «high» will be used without limitation for reference respectively to the upper portion and to the lower portion of FIGS. 1 to 5.

Figures 1, 5:
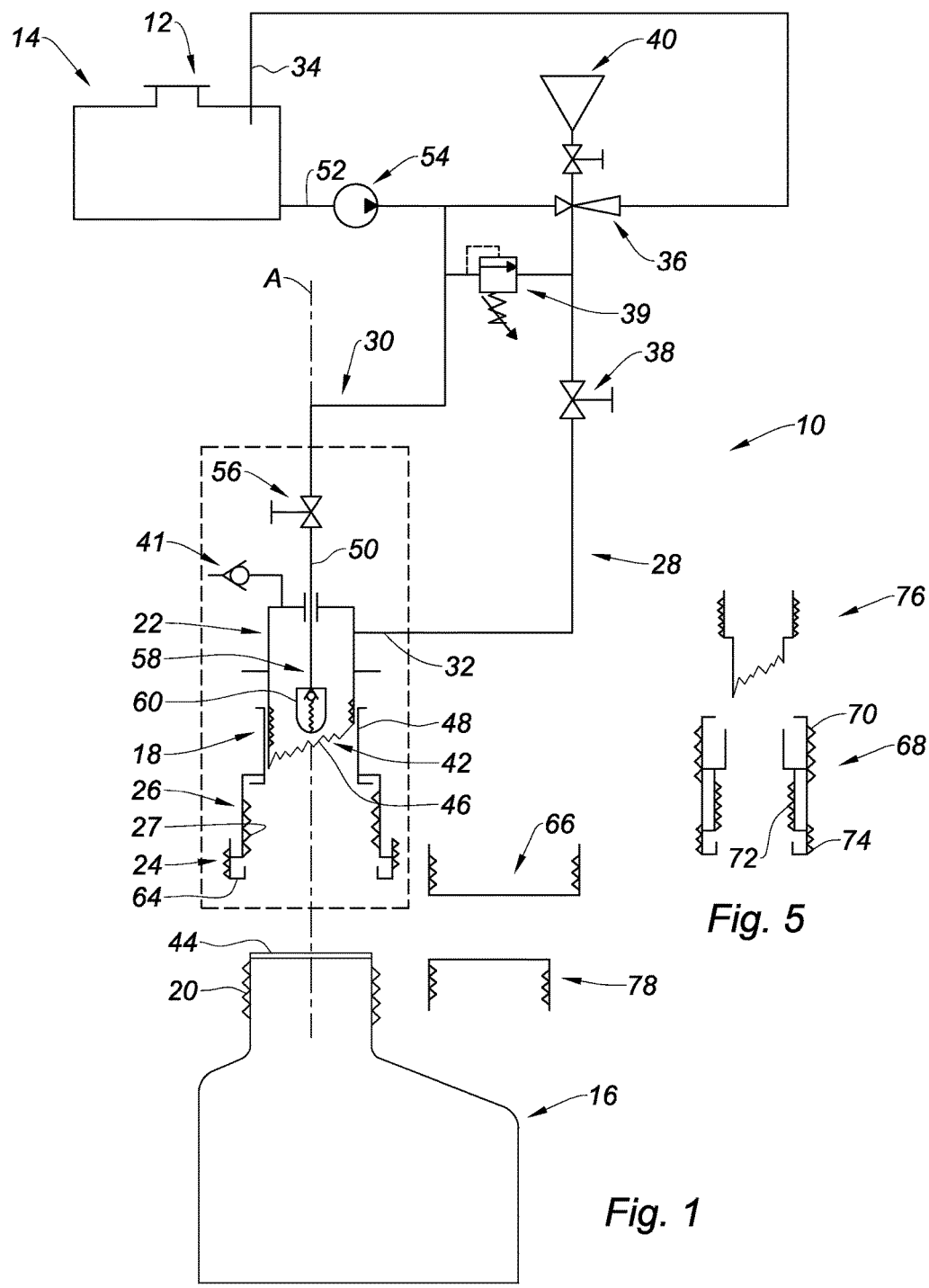
FIG. 1 is a schematic front view which illustrates a filling device according to the invention connected to a tank of a sprayer and to a can.
FIG. 5 is a schematic detail view which illustrates a secondary sleeve and a secondary perforator according to an embodiment of the invention.

In FIG. 1, there is represented a device 10 for filling a tank 12 of an agricultural-type sprayer 14, from a can 16 containing a liquid product, for example a phytosanitary product.

The device 10 includes a drawing end-piece 18 with a generally cylindrical shape which is complementary to the shape of the screw neck 20 of the can 16 and which extends axially along a drawing axis A, from a first upper end 22 to a second lower end 24.

The second lower end 24 of the drawing end-piece 18 is equipped with a main sleeve 26 which is designed to be connected on the neck 20 of the can 16 in a sealed manner.

To this end, the main sleeve 26 presents a generally cylindrical shape which extends axially along the drawing axis A and which is provided with a tapping 27 so as to form a nut adapted to be screwed on the neck 20 of the can 16.

The diameter of the tapped main sleeve 26 is preferably of 63 millimeters in order to adapt to the diameter of the neck of the most common cans.

In addition, the device 10 includes a drawing pipe 28 and a rinsing pipe 30.

The drawing pipe 28 presents a first end 32 which is connected on the drawing end-piece 18 and a second end 34 which is adapted to be connected on the tank 12, in order to enable the drawing of the liquid from the can 16 to the tank 12.

For this purpose, a Venturi-type suction means 36 is branched on the drawing pipe 28, in order to create a suction depression in the drawing pipe 28.

Advantageously, a first valve 38 cooperates with the drawing pipe 28 in order to enable adjustment, or cut-off, of the suction flow rate through the drawing pipe 28.

To promote the ergonomics, the first valve 38 is hand or foot operable.

In a non-limiting manner, it is also possible to adjust the suction flow rate through the drawing pipe 28 by means of a pressure limiter 39 which short-circuits the suction means 36.

In FIG. 1, there is also represented an incorporated hopper 40 which is arranged in the vicinity of the suction means 36 and which enables to directly fill the tank 12.

Figure 2:
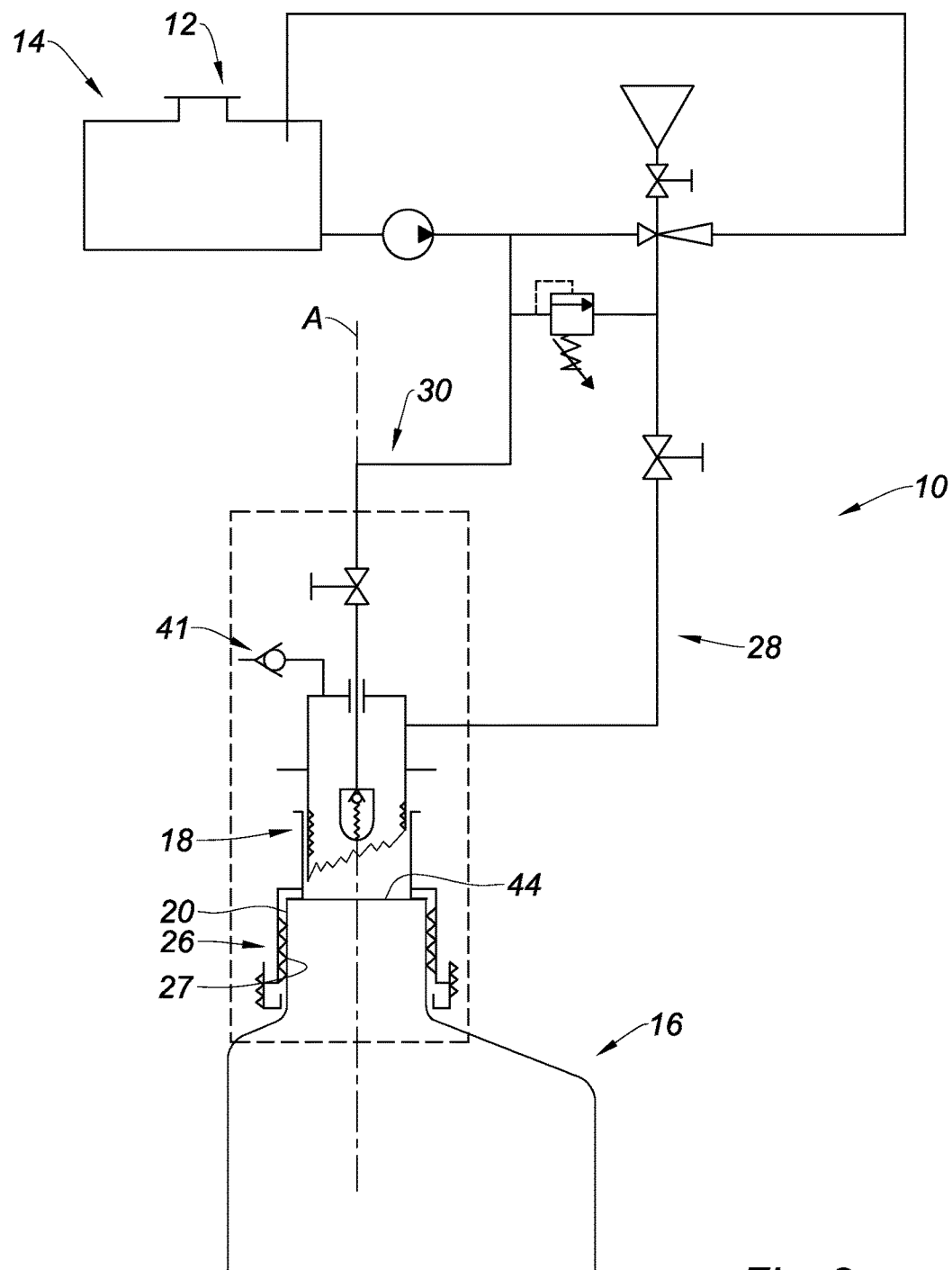
FIG. 2 is a schematic view similar to the view of FIG. 1 which illustrates the main sleeve screwed on the neck of the can to be emptied.

In addition, the drawing end-piece 18 is equipped with a check valve 41 forming a vent which enables suction of air contained in the can 16 when the main sleeve 26 is screwed on the can 16, as can be seen in FIG. 2. According to another aspect of the invention, the drawing end-piece 18 is equipped with a main perforator 42 which presents a shape of a generally cylindrical bushing along the drawing axis A and which is adapted to puncture a lid 44 closing the neck 20 of the can 16.

For this purpose, the main perforator 42 presents a perforating free end 46, for example an obliquely cut tip end.

Figure 3:
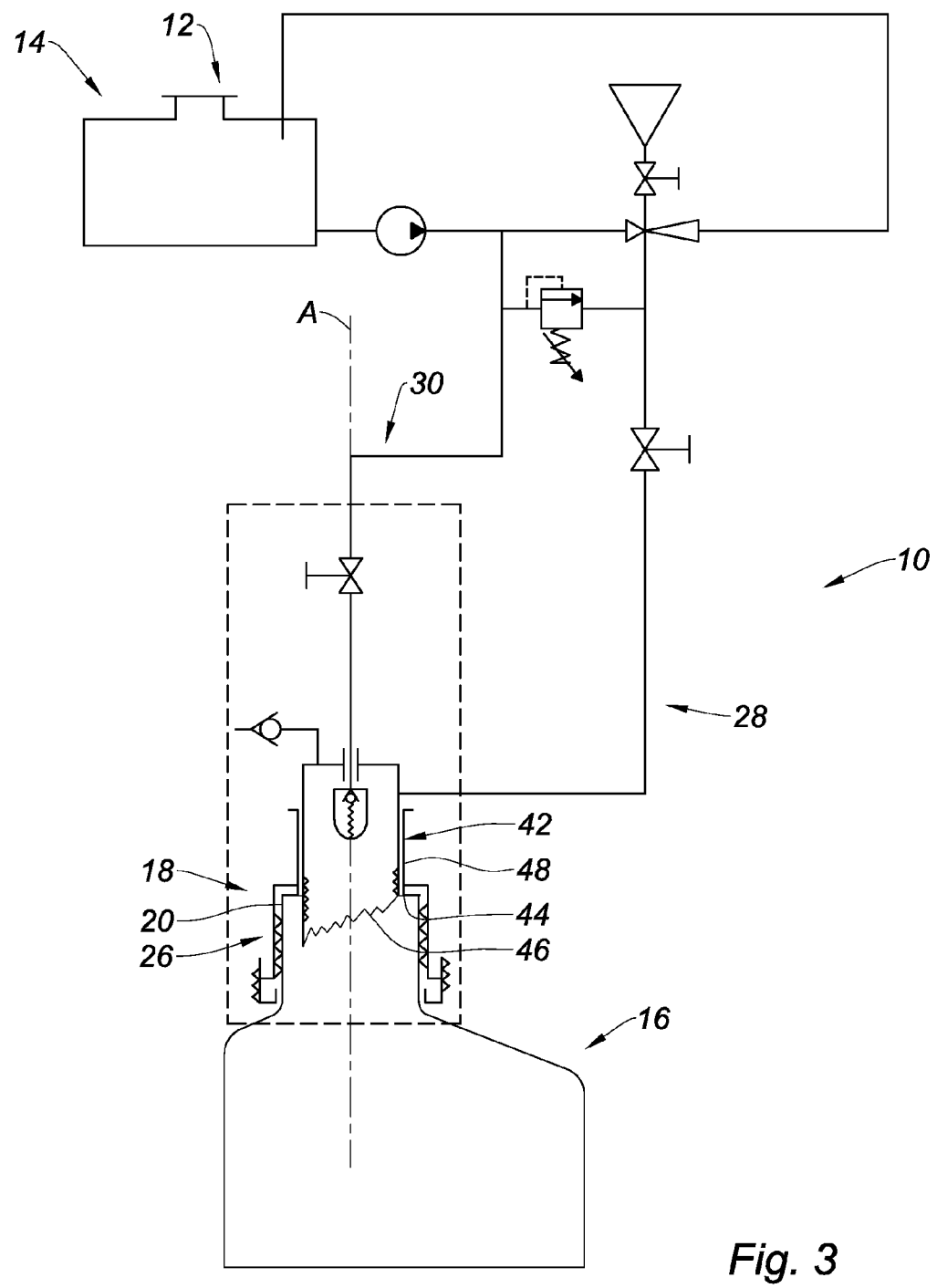
FIG. 3 is a schematic view similar to the view of FIG. 1 which illustrates the perforator 42 in its position of puncturing the lid of the can.

The main perforator 42 is freely mounted in axial translation along the drawing axis A, inside a complementary sheath 48 formed by the main sleeve 26, in a sealed manner, so that the main perforator 42 is slidably mounted between a retracted position, represented in FIG. 1, and a puncturing position, represented in FIG. 3, wherein the perforating free end 46 enables the puncturing of the lid 44 of the neck 20.

Advantageously, the main perforator 42 is associated with elastic return means (not represented) in order to return the main perforator 42 back to its retracted position.

The device 10 according to the invention is also designed to enable the rinsing of the can 16 once the latter is empty.

For this purpose, the rinsing pipe 30 presents a first end 50 which is connected to the drawing end-piece 18 and a second end 52 which is connected to a water reservoir (not represented), for example a reservoir carried by the sprayer 14, in order to inject water in the can 16.

To this end, the device 10 includes an injection pump 54 which allows circulation of water through the rinsing pipe 30.

The pump 54 also cooperates with the suction means 36 in order to create a depression in the drawing duct 28.

In addition, a second valve 56 cooperates with the rinsing pipe 30 in order to enable adjustment, or cut-off, of the fluid flow rate through the rinsing pipe 30.

More particularly, the drawing end-piece 18 includes a rinsing hose 58 which is connected on the first end 50 of the rinsing pipe 30.

The rinsing hose 58 is equipped with a head forming a rinsing nozzle 60 which is adapted to project water all over the walls of the can 16, so as to rinse effectively the can 16.

Figure 4:
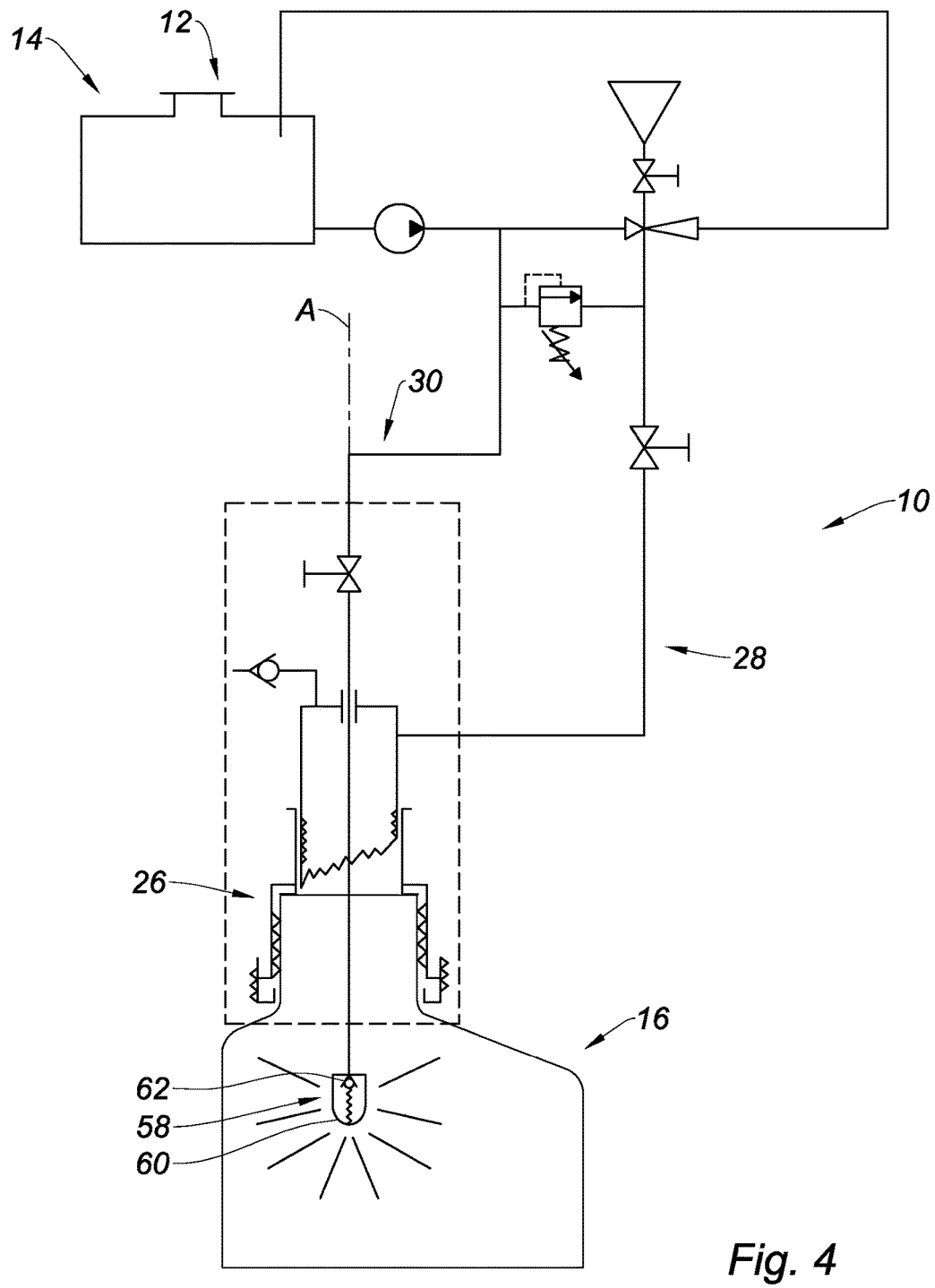
FIG. 4 is a schematic view similar to the view of FIG. 1 which illustrates the rinsing hose in its position of rinsing the can.

The rinsing hose 58 is slidably mounted on the main perforator 42, along the drawing axis A, between a high rest position represented in FIG. 1, wherein the rinsing hose 58 is retracted in the end-piece 18, and a low rinsing position represented in FIG. 4, wherein the rinsing hose 58 is deployed inside the can 16.

In addition, the rinsing hose 58 is mounted in free rotation about the drawing axis A in order to rinse the lateral inner walls of the can 16.

Also, the rinsing hose 58 is equipped with a check valve 62 which prevents the product contained in the can 16 from rising through the rinsing pipe 30.

According to another aspect of the invention, with reference to FIG. 1, the main sleeve 26 presents a lower free end equipped with an annular anti-drip gutter 64 which extends about the drawing axis A and which is designed to recover the trickling drops coming from the drawing end-piece 18.

Thus, when the main sleeve 26 is unscrewed from the can 16, products residues trickling from the sleeve are retained in the gutter 64.

Complementarily, the device 10 includes a rinsing cap 66 which is adapted to be screwed on the main sleeve 26 in a sealed manner in order to enable the rinsing from the inside of the drawing end-piece 18, for example by the rinsing hose 58, and to prevent the trickling of the product.

According to a preferred embodiment which is represented in FIG. 5, the device 10 includes a secondary sleeve 68 which presents a first threading 70 adapted to cooperate with the tapping 27 of the main sleeve 26 of the drawing end-piece 18 and a tapping 72 adapted to cooperate with the neck of a secondary can (not represented) which presents a different diameter from the previously described can 16.

In addition, the secondary sleeve 68 presents a secondary threading 74 adapted to cooperate with a closure cap (not represented) provided to avoid possible residual flow.

Complementarily, the secondary sleeve 68 is associated with a secondary perforator 76 which presents a generally cylindrical shape along the drawing axis A and which is adapted to be mounted on the main perforator 42.

The secondary perforator 76 is designed to puncture the lid of the secondary can.

The device 10 according to the invention allows transferring the product contained in the can 16 to the tank 12, without risk of leakage of the product or contact of the product with the operator.

An example of use of the device 10 is described below in a chronological way.

The suction means 36 is actuated in order to create a depression in the drawing pipe 28.

After having unscrewed the cap 78 of the can 16, the operator screws the main sleeve 26 on the can 16, above the lid 44, as can be seen in FIG. 2.

Referring to FIG. 3, the operator slidably drives the main perforator 42 to its puncturing position in order to puncture the lid 44.

The operator operates the first valve 38 in order to adjust the suction flow rate of the drawing pipe 28.

The device 10 sucks the air that flows through the check valve 41 forming a vent provided for this purpose.

The operator tilts the can 16 so that the product contained in the can 16 is sucked by the device 10.

Tilting of the can 16 may be performed manually or by means of a lifting device which may be arranged on the sprayer in order to facilitate this operation.

Once the can 16 is completely emptied, the operator actuates the second valve 56 in order to feed the rinsing hose 58 with rinsing water and drives the rinsing hose 58 in translation and/or in rotation inside the can 16 in order to rinse the inner walls of the can 16, as can be seen in FIG. 4.

Rinsing water is sucked simultaneously by the suction means 36.

Once the can 16 is emptied and rinsed, the operator can close the check valve 41 to create a strong depression in the can 16 so as to compress the can 16 in order to reduce the volume of waste.

Afterwards, the operator unscrews the main sleeve 26 from the can 16.

In the case where the can 16 is partially emptied, the operator can stop suction at any time by driving the first valve 38.

The operator can then unscrew the main sleeve 26 from the can 16 then screws the rinsing cap 66 on the sleeve 26 in order to be able to rinse inside the drawing end-piece 18.

In order to free the user from having to carry and tilt the can 16 during the liquid suction step, the device according to the invention can be equipped with a lifting device (not represented).

For example, the lifting device includes a cradle which is designed to carry the can 16 and which is pivotally mounted about a pivot axis perpendicular to the drawing axis A, between an initial loading position wherein it is possible to load the can on the cradle without effort and wherein the operator can screw the main sleeve 26 on the can 16, and a suction position wherein the carriage is pivoted half a turnabout its pivot axis, in order to enable suction of the product contained in the can 1 by the device 10.

According to another variant of the invention, compressed air coming from a compressed air source 80 is injected in the can 16 in order to push the product contained in the can 16 toward the drawing pipe 28, instead of sucking the product by the suction means 36.

To this end, the neck 20 of the can 16 is tilted downward.

Air may be injected by the check valve 41 through the drawing end-piece 18.

Figure 6:
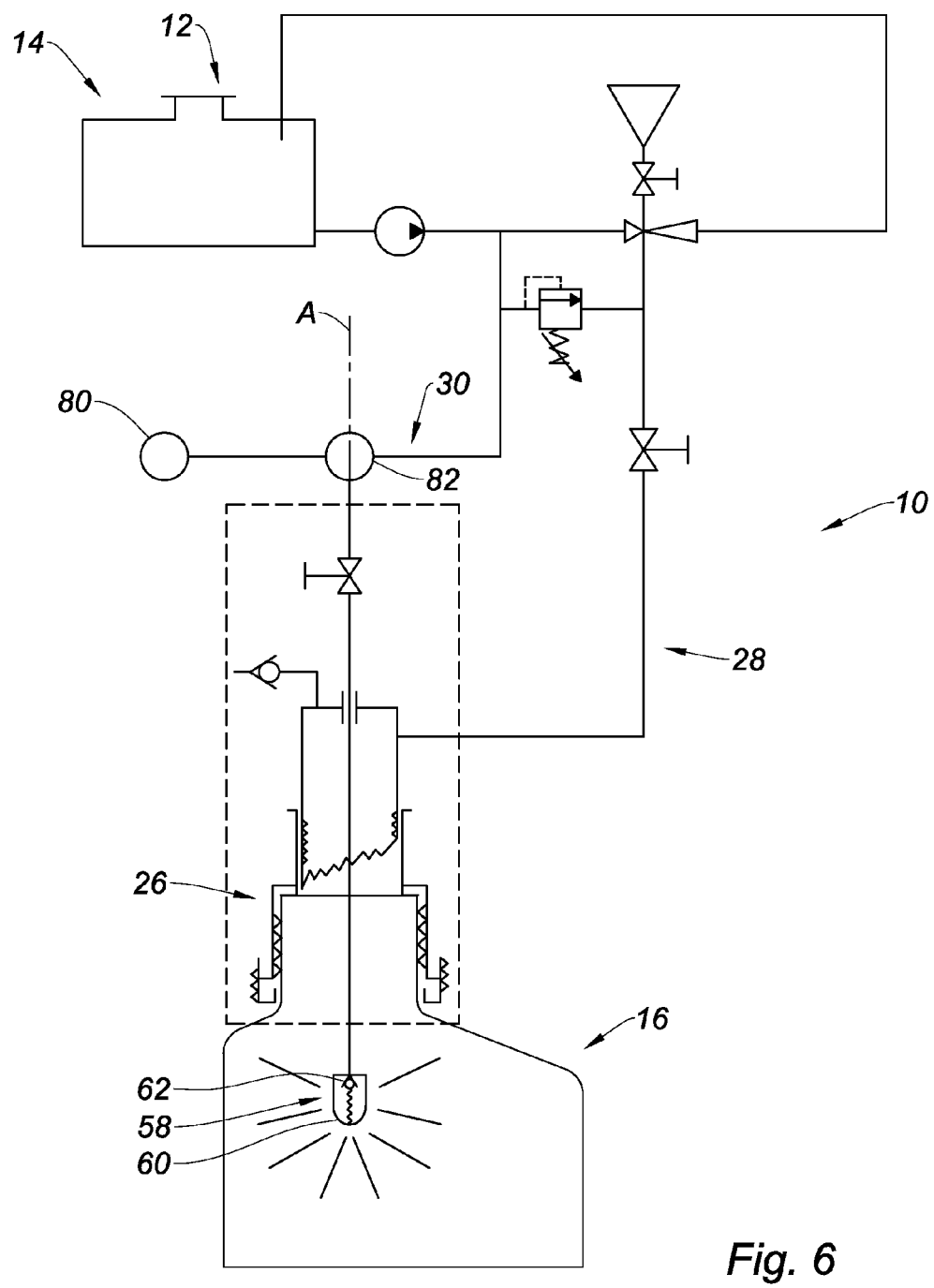
FIG. 6 is a schematic view similar to the view of FIG. 1 which illustrates the rinsing hose in a position of injecting air in the can, according to a variant of the invention.

According to a preferred variant represented in FIG. 6, air is injected in the can 16 by the rinsing hose 58 of which nozzle 60 is inserted in the can 16, beyond the neck 20.

Injecting air inside the can 16 by the nozzle 60 promotes the flow of the product which is not disturbed by the entry of air through the neck 20.

The rinsing hose 58 is fed with compressed air by the compressed air source 80 which is connected to the rinsing pipe 30 by a three-way valve 82 arranged upstream of the valve 56.

The compressed air source 80 may come from an auxiliary sprayer filled with pressurized air, or a manual pump or still a compressed air canister equipping the sprayer 14.

Besides, air injected in the can 16 may come from an intermediate air reservoir, the air of which would be pushed by the rinsing water injection pump 54 via a bypass of the rinsing pipe 30 and a three-way valve 56 downstream of said air reservoir.

In all cases, the pressure of the air injected in the can 16 is limited to a maximum value in order not to deteriorate the can 16.

Figure 7:
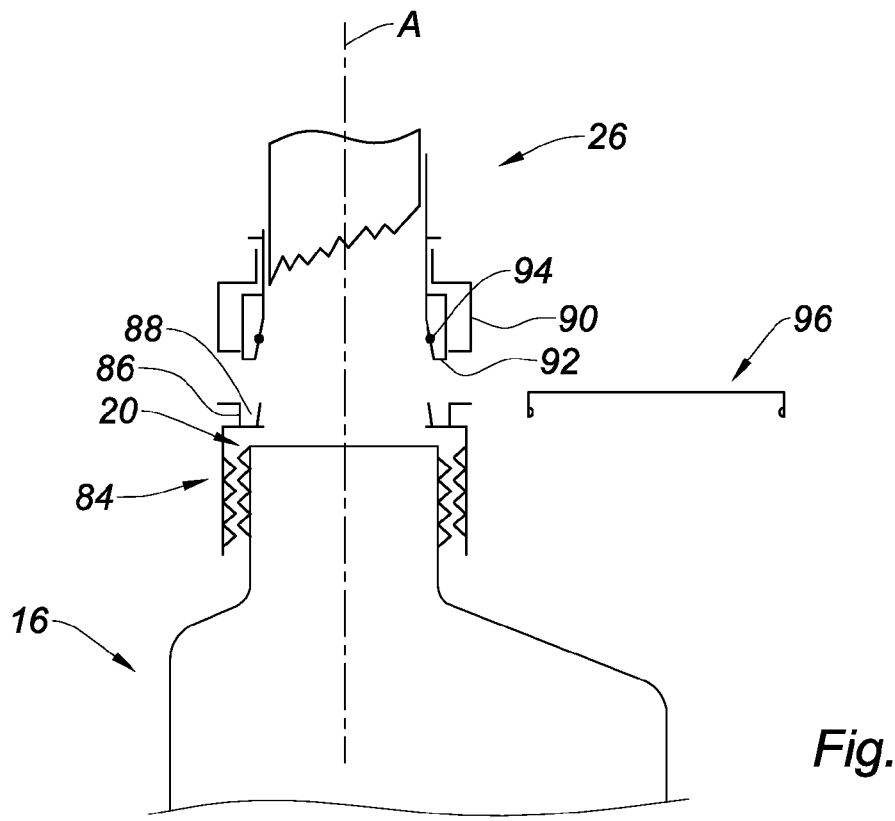
FIG. 7 is a schematic detail view which illustrates a quarter turn-type quick-fixing main sleeve, according to one variant.

According to another variant represented in FIG. 7, the device 10 includes a quarter turn type quick-fixing main sleeve 26.

According to this variant, the can 16 is equipped with a cap 84 adapted to be screwed on the neck 20 and which delimits a quarter turn type female footprint 86 and an upper annular groove 88.

The annular groove 88 extends about the drawing axis A and presents a truncated-cone shaped radial section.

Complementarily, the main sleeve 26 delimits a quarter turn type male footprint 90 which is adapted to cooperate with the female footprint 86 associated to the cap 84.

In addition, the main sleeve 26 includes a crown 92 whose shape is complementary to the shape of the groove 88 and an elastomeric seal 94 in order to ensure sealing between the main sleeve 26 and the neck 20 of the can 16.

Besides, the neck 20 of the can is closed by a sealed-type lid 44 or by a sealing disc held by compression.

Furthermore, a mechanical protective cap 96 is provided to be fitted over the cap 84 in order to protect the lid 44 or the sealing disc.

Figure 8:
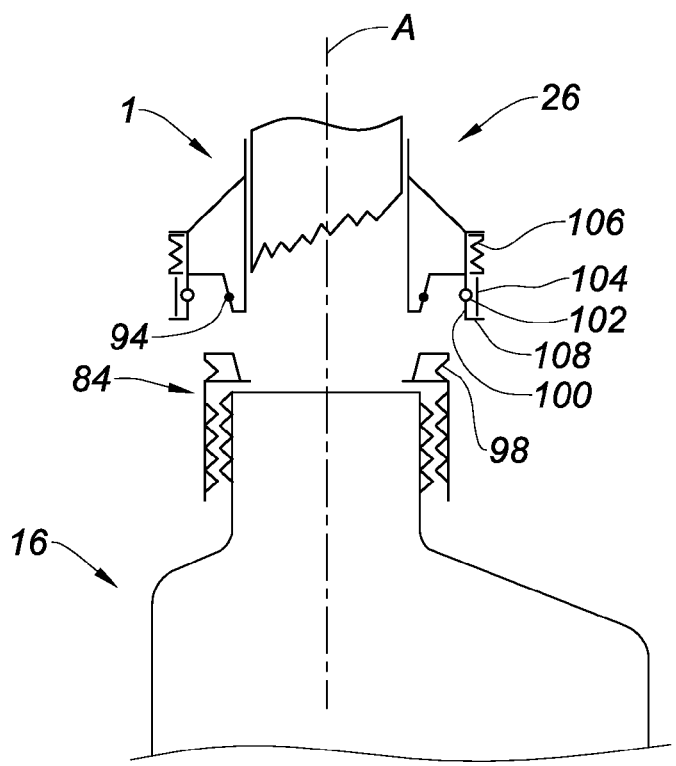
FIG. 8 is a schematic detail view which illustrates a quarter turn-type quick-fixing main sleeve, according to another variant.

In FIG. 8, there is represented a variant which is similar to the variant illustrated in FIG. 7 and described previously, according to which fixing the main sleeve 26 on the cap 84 specific to the can 16 is carried out by pushing along the drawing axis A.

To this end, the cap 84 delimits an annular peripheral groove 98 about the drawing axis A.

Complementarily, the main sleeve 26 includes an annular cage 100 which encloses balls 102 which are arranged so as to cooperate with the groove 98 of the cap 84.

The balls 102 are radially locked by an annular ring 104 arranged at the periphery of the cage 100.

In addition, a spring 106 elastically returns the ring 104 downward in abutment on a seat 108 delimited by the main sleeve 26.

Figure 9:
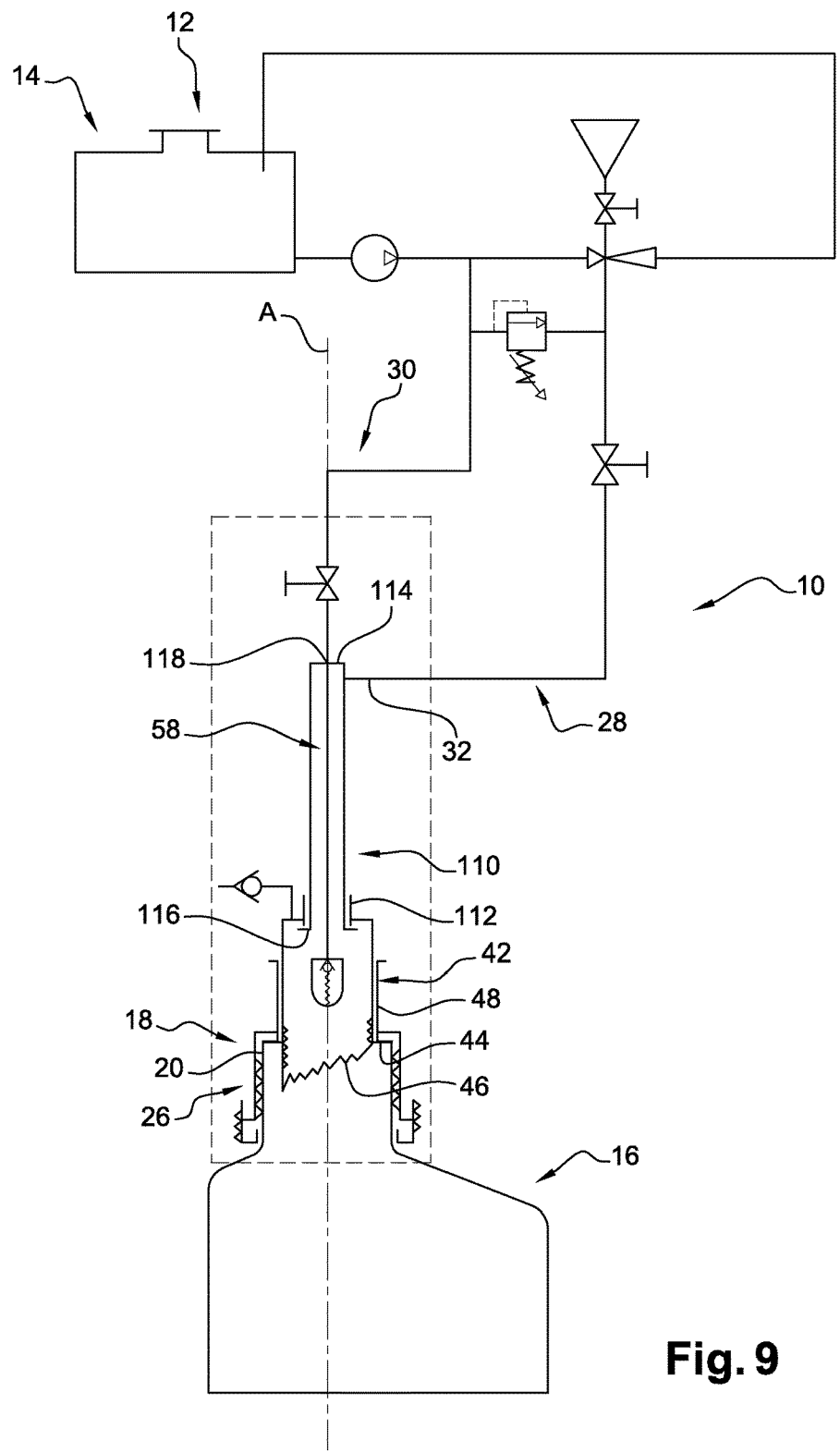
FIG. 9 is a schematic view similar to the view of FIG. 1 which illustrates the drawing stick in its retracted position.
Figure 10:
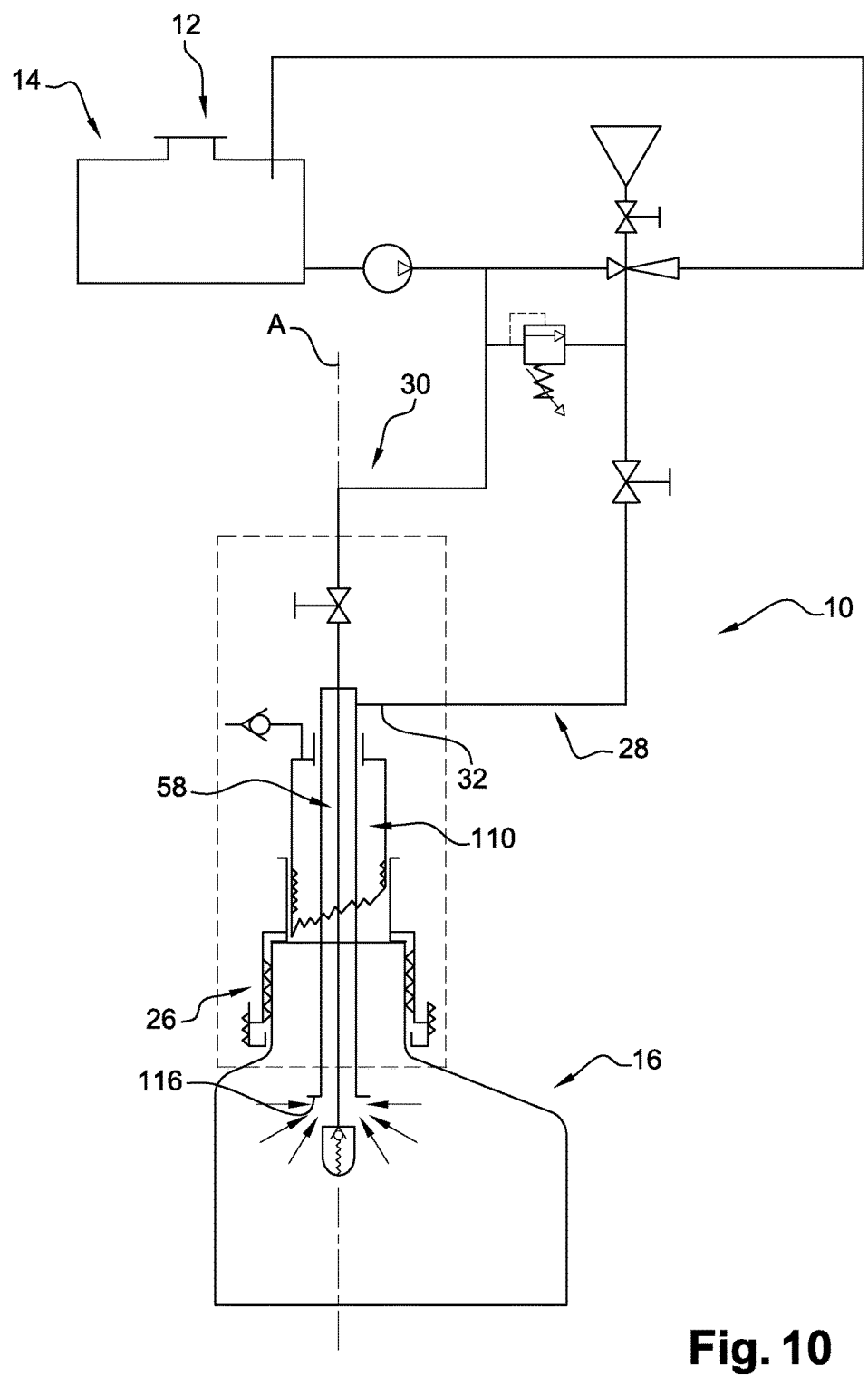
FIG. 10 is a schematic view similar to the view of FIG. 1 which illustrates the drawing stick in its position of drawing and the rinsing hose in its position of rinsing.
Figure 11:
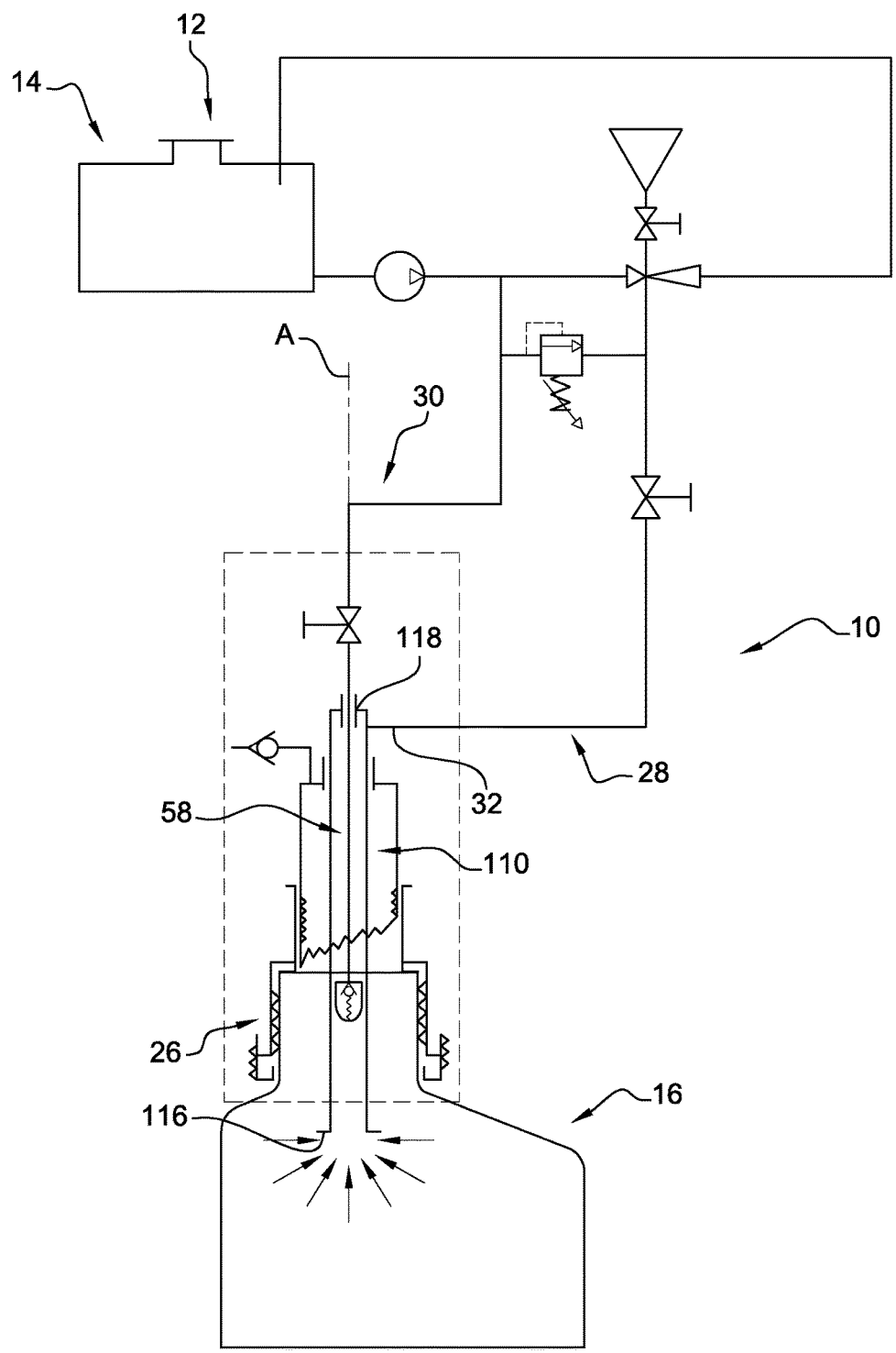
FIG. 11 is a schematic view similar to the view of FIG. 1 which illustrates the drawing stick in its position of drawing and the rinsing hose in its position of rest.

According to a variant represented in FIGS. 9 to 11, the drawing of the liquid contained in the can 16 is no longer realized directly through the drawing end-piece 18, but by means of a drawing stick.

According to this variant, the device 10 includes a drawing stick 110 which extends axially along the drawing axis A through a hole 112 delimited by an upper face of the drawing end-piece 18.

The drawing stick 110 extends from a first upper end 114 which is connected on the drawing pipe 28, to a second opened lower free end 116 of drawing.

In addition, the drawing stick 110 is slidably mounted axially along the drawing axis A with regard to the drawing end-piece 18, through the hole 112 associated, between a retracted position represented in FIG. 9, and a drawing position represented in FIGS. 10 and 11 wherein the free end of the drawing stick 110 is lowered substantially to the bottom of the can 16 to suck the liquid contained in the can 16.

Besides, the rinsing hose 58 described previously extends through a hole 118 which is delimited by the first upper end of the drawing stick 110.

According to a preferred embodiment, the drawing stick 110 and the rinsing hose 58 are fixed relative to one another and have the same movement.

Therefore, in a non-limiting manner, the drawing stick 110 and the rinsing hose 58 may be slidably mounted relative to each other independently, as illustrated in FIG. 11.

This variant, including the drawing stick 110, allows to draw a major portion of the liquid contained in the can 16 without the need to turn the can upside down.

This feature allows easier dosing of the volume of liquid remaining in the can 16 and thus also the volume of liquid drawn off.

For a complete emptying of the can 16, after having withdrawn the maximum volume of liquid through drawing stick 110, it is possible to return the can 16 and to arrange the drawing stick 110 in its retracted position at the bottom of the drawing end-piece 18 before aspirating the remaining liquid through the drawing stick 110.

The present description of the invention is given as a non-limiting example.

The invention claimed is:

1. A device for transferring a liquid from a can to a tank in a sealed manner, the device comprising:
   a drawing end-piece with a generally cylindrical shape which extends axially along a drawing axis from a first end to a second end equipped with at least one main sleeve, said sleeve being designed to be connected on the neck of the can in a sealed manner,
   a drawing pipe which presents a first end connected on the drawing end-piece and a second end adapted to be connected on the tank in order to enable drawing of the liquid from the can to the tank, and
   a rinsing pipe which presents a first end connected on the drawing end-piece and a second end adapted to be connected on a supply source of a rinsing fluid, in order to inject said rinsing fluid in the can,
   wherein the drawing end-piece includes a rinsing hose which is connected on the first end of the rinsing pipe and which is slidably mounted axially along the drawing axis, between a rest position wherein the rinsing hose is retracted in the drawing end-piece and a rinsing position wherein the rinsing hose is deployed inside the can to rinse the inner walls of the can.

2. The device according to claim 1, wherein the rinsing hose is mounted in free rotation about the drawing axis in order to rinse the inner walls of the can.

3. The device according to claim 1, wherein the main sleeve presents a free end equipped with an annular anti-drip gutter which extends about the drawing axis and which is designed so as to recover the trickling drops coming from the drawing end-piece.

4. The device according to claim 1, further comprising a rinsing cap which is adapted to be mounted on the main sleeve in a sealed manner in order to enable rinsing of the drawing end-piece.

5. The device according to claim 1, further comprising a suction means which cooperates with the drawing pipe in order to enable the drawing of the liquid from the can to the tank.

6. The device according to claim 1, wherein the rinsing hose is adapted to inject air directly inside the can, beyond the neck of the can.

7. The device according to claim 1, wherein the drawing end-piece includes a check valve forming a vent.

8. The device according to claim 1, wherein the drawing end-piece is equipped with a main perforator which presents a generally cylindrical shape along the drawing axis and which is adapted to puncture a lid closing the neck of the can.

9. The device according to claim 8, wherein the main perforator presents a perforating free end, said perforator being slidably mounted axially along the drawing axis, between a retracted position and a puncturing position wherein said perforating free end enables the puncturing of the lid of said neck.

10. The device according to claim 1, further comprising at least one secondary sleeve which is designed to be mounted on the drawing end-piece and to be connected on the neck of a secondary can in a sealed manner.

11. The device according to claim 10, wherein the secondary sleeve is associated with a secondary perforator which presents a generally cylindrical shape along the drawing axis and which is adapted to be mounted on the main perforator (42).

12. The device according to claim 1, further comprising a drawing stick which extends axially along the drawing axis through a hole delimited by the drawing end-piece, from a first end connected on the drawing pipe, to a second drawing free end, the drawing stick being slidably mounted axially along the drawing axis with regard to the drawing end-piece, between a retracted position and a drawing position wherein the free end of the drawing stick is deployed to draw up the liquid contained in the can.

* * * * *